United States Patent [19]

Stoka et al.

[11] 4,427,096

[45] Jan. 24, 1984

[54] DEVICE FOR MOUNTING A GUIDING BOLT OF A FLOATING-CALIPER SPOT-TYPE DISC BRAKE

[75] Inventors: Roerto Stoka, Nauheim; Hajo Pickel, Kelkheim, both of Fed. Rep. of Germany

[73] Assignee: ITT Industries Inc., New York, N.Y.

[21] Appl. No.: 334,851

[22] Filed: Dec. 28, 1981

[51] Int. Cl.³ .............................................. F16D 65/09
[52] U.S. Cl. ................................ 188/73.34; 188/73.45
[58] Field of Search ................... 188/71.1, 73.34, 73.39, 188/73.45

[56] References Cited

U.S. PATENT DOCUMENTS

| 3,051,272 | 8/1962 | Burnett | 188/73.39 |
| 4,042,074 | 8/1977 | Ishihara | 188/73.45 |
| 4,111,285 | 9/1978 | Hönick | 188/73.34 |
| 4,121,698 | 10/1978 | Baum | 188/73.45 |
| 4,305,483 | 12/1981 | Ikeda | 188/73.39 |
| 4,347,917 | 9/1982 | Kita | 188/73.45 |

FOREIGN PATENT DOCUMENTS

| 2724436 | 12/1977 | Fed. Rep. of Germany | 188/73.45 |
| 2825649 | 12/1978 | Fed. Rep. of Germany | 188/73.45 |
| 55-86929 | 7/1980 | Japan | 188/73.45 |

*Primary Examiner*—Douglas C. Butler
*Assistant Examiner*—R. R. Diefendorf

*Attorney, Agent, or Firm*—James B. Raden; Marvin M. Chaban

[57] ABSTRACT

A mounting arrangement for use in a floating-caliper spot-type disc brake including a carrier component and a caliper component, for mounting on one of the components a guide bolt which is slidably received in a bore of the other component, includes a recess in the one component for partially receiving the bolt, this recess being open, over its entire axial length, onto the periphery of the one component to provide a free path for the movement of the bolt into and out of the recess. The bolt and the one component have cooperating abutment surfaces either within or outside the recess, which prevent the bolt from turning about its longitudinal axis once properly received in the recess. The abutment surface of the bolt may be provided either on a key-bit-shaped or on a cross-sectionally polygonal, especially square, portion of the bolt. The abutment surface of the one component is so oriented as to cause the bolt to turn into its desired position during the introduction of the bolt into the recess and in response to mutual engagement of the abutment surfaces. The bolt may have a stop surface against which the mounting portion of the one component which has the recess rests. A nut is threaded onto the bolt and, upon tightening, frictionally and/or positively retains the bolt in its proper position with the recess.

7 Claims, 4 Drawing Figures

DEVICE FOR MOUNTING A GUIDING BOLT OF A FLOATING-CALIPER SPOT-TYPE DISC BRAKE

BACKGROUND OF THE INVENTION

The present invention relates to a mounting device for a guiding bolt of a floating-caliper spot-type disc brake.

In conventional brakes of this type, the guiding between the caliper and carrier components is formed by at least one guiding bolt sliding in a bore of one of the components and by a guiding element spaced in circumferential direction from the guiding bolt. Then, a recess may be provided for the accommodation of the threaded end portion of the guiding bolt, such recess being continuous in the direction of the axis of the guiding bolt and being slotted over its entire axial length and transverse width towards the periphery of the one component. In this construction, a nut is threaded onto the end portion of the guiding bolt to clamp the guiding bolt to the component provided with the recess when tightened. The position of the slot is such as to permit the removal of the caliper component from the carrier component after loosening the nut.

In a floating caliper spot-type disc brake the caliper component embraces the brake disc like a U and includes a hydraulically actuatable piston which directly actuates the associated brake shoe which is situated on one side of the brake disc. The brake shoe disposed on the opposite side of the brake disc is indirectly urged against the brake disc as a result of the displacement of the caliper component in relation to the brake carrier component. The guiding of the caliper is effected by means of one or of several guiding bolts which are fastened to one of the two components, that is, either to the caliper component or to the carrier component. When replacing the brake shoes, this mounting arrangement will be disengaged and the caliper component will be moved relative to the carrier component to assume a position which affords easy access to the brake shoes to be replaced.

A disc brake of this type is described in German patent No. 26 49 627, wherein the caliper component is guided by means of two guiding bolts slidable in bores of the caliper component. Screw couplings serve to fasten the guiding bolts to the brake carrier component. One guiding bolt includes at its end a threaded step extending through a recess of the brake carrier component and having a nut threaded thereunto, so that the guiding bolt will be fastened to the brake carrier component after tightening of this nut. The recess receiving the one guiding bolt is slotted and open towards the edge of the brake carrier component so as to make it possible to pivot the caliper component together with the one guiding bolt about the other guiding bolt after loosening of the fastening nut. Following the exchange of brake shoes with the caliper component swung upwards, the caliper component will be swivelled to its former position and the guiding bolt will be secured in the recess of the brake carrier component by tightening the nut. It has to be regarded as particularly disadvantageous in this known device that the guiding bolts are not secured against turning about their longitudinal axes; this allows disengagement of the threaded couplings during operation. In addition, it is rendered difficult if not impossible to tighten the nut, since, due to the presence of a seal surrounding the accessible portion of the bolt, there is no chance to prevent joint rotation of the bolt with the nut by retaining the bolt during the tightening of the nut.

SUMMARY OF THE INVENTION

Accordingly, it is a a general object of the present invention to avoid the disadvantages of the prior art.

More particularly, it is an object of the invention to provide a mounting arrangement for mounting a guiding bolt on one of the disc brake components, which is not possessed of the disadvantages of the conventional mounting arrangement of this type.

Still another object of the present invention is to so construct the mounting arrangement of the type here under consideration as to be capable of preventing the guiding bolt from turning about its longitudinal axis during the tightening and loosening of the nut threaded thereunto, as well as during the operation of the brake.

An additional object of the present invention is to develop a mounting arrangement of the above type which, despite its ability to prevent turning of the bolt, does not require the provision of any additional elements, and which permits quick assembly and disassembly.

It is a concomitant object of the invention to so design the mounting arrangement as to be simple in construction, inexpensive to manufacture, easy to manipulate and reliable in operation nevertheless.

In pursuance of these objects and others which will become apparent hereafter, one feature of the present invention resides in a mounting arrangement for use in a spot-type disc brake including a carrier component and a caliper component for mounting on one of the components an elongated guiding bolt which is received for sliding in its axial direction in a bore of the other component and has a threaded portion disposed at the exterior of the bore, this mounting arrangement comprising means on the one component for delimiting a recess for partially receiving the guiding bolt such that at least an end section of the threaded portion extends beyond said recess as considered axially away from the other component, said recess being open over the entire axial length thereof onto the periphery of the one component to leave a free path for the movement of the threaded bolt in a predetermined transverse direction into and out of said recess; cooperating abutment means on the threaded bolt and on the one component for preventing the threaded bolt from turning about its longitudinal axis when received in said recess; and a nut threaded onto said end section of the threaded portion of the threaded bolt and engaging the one component in its tightened condition so as to prevent movement of the threaded bolt in said predetermined transverse direction relative to the other component.

The construction according to the present invention has the advantage that the mounting device has a torsion-preventing mechanism for the guiding bolt, which mechanism includes abutment surfaces formed on the guiding bolt and on the one component which has the recess for the accommodation of the guiding bolt. For this purpose, the guiding bolt includes an abutment position having at least one circumferential surface portion which is eccentric relative to the longitudinal axis of the bolt and is in abutment with the abutment surface of the one component in the operating position of the caliper component. These abutment surfaces on the bolt on the one component render it possible to use low-cost and easy manufacturing operations, for instance, chipless forming, for the making of the abutment surfaces. Tightening of the nut can be carried out by a tool without any need for holding the guiding bolt. Moreover, disengagement of the threaded coupling by torsion of the guiding bolt during operation is safely prevented. By so arranging the abutment surface of the one component as to extend approximately parallel to the wall surface of the recess or slot, the abutment surfaces will cooperate with one another already at the commencement of the hang-in or swing-in movement of the caliper component, so that no alignement of the relative position of the abutment surfaces prior to the tightening of the nut is necessary. As a result of this, disassembly and assembly of the caliper component for inspection or replacement purposes can be performed more quickly and therefore at a lower cost then heretofore possible.

It is particularly advantageous when the abutment surface of the one component is constituted by a wall surface of the recess, since all that the design of the torsion-preventing mechanism than necessitates is to provide the abutment surface at the guide bolt.

When the abutment portion of the bolt is designed as a shoulder shaped like a key bit and when, for instance, the abutment surface of the one component is constituted by the wall surface of the slot or recess, there will result in a particularly advantageous manner an automatic adjustment of the relative position of the abutment surfaces during the hang-in or swing-in movement of the caliper component, in that one open edge of the recess, when contacting the circumferential surface of the abutment portion, will turn the guiding bolt during the hang-in or swing-in movement to assume that position in which the abutment surfaces bear against each other.

Advantageously, an abutment surface which is situated outside the slots recess affords the possibility to form the abutment portion of the guiding bolt as a cross-sectionally polygonal element, particularly as a cross-sectionally square portion, and to use the end surface of the abutment portion as an axial stop when tightening the threaded coupling. In addition, the abutment surface of the one component may expediently extend at an acute angle to the wall surface of the slot. This results in an automatic adjustment of the relative position of the abutment surfaces during the hang-in or swing-in movement. In this arrangement, an edge of the cross-sectionally square portion of the bolt will contact the abutment surface of the one component and will turn the guiding bolt to assume that position in which the abutment surfaces rest against one another.

BRIEF DESCRIPTION OF THE DRAWING

Above-mentioned and other features and objects of this invention will become more apparent by references to the following description taken in conjunction with the accompanying drawing, in which.

DETAILED DESCRIPTION OF THE PREFERRED EMBODIMENTS

Figure 1:
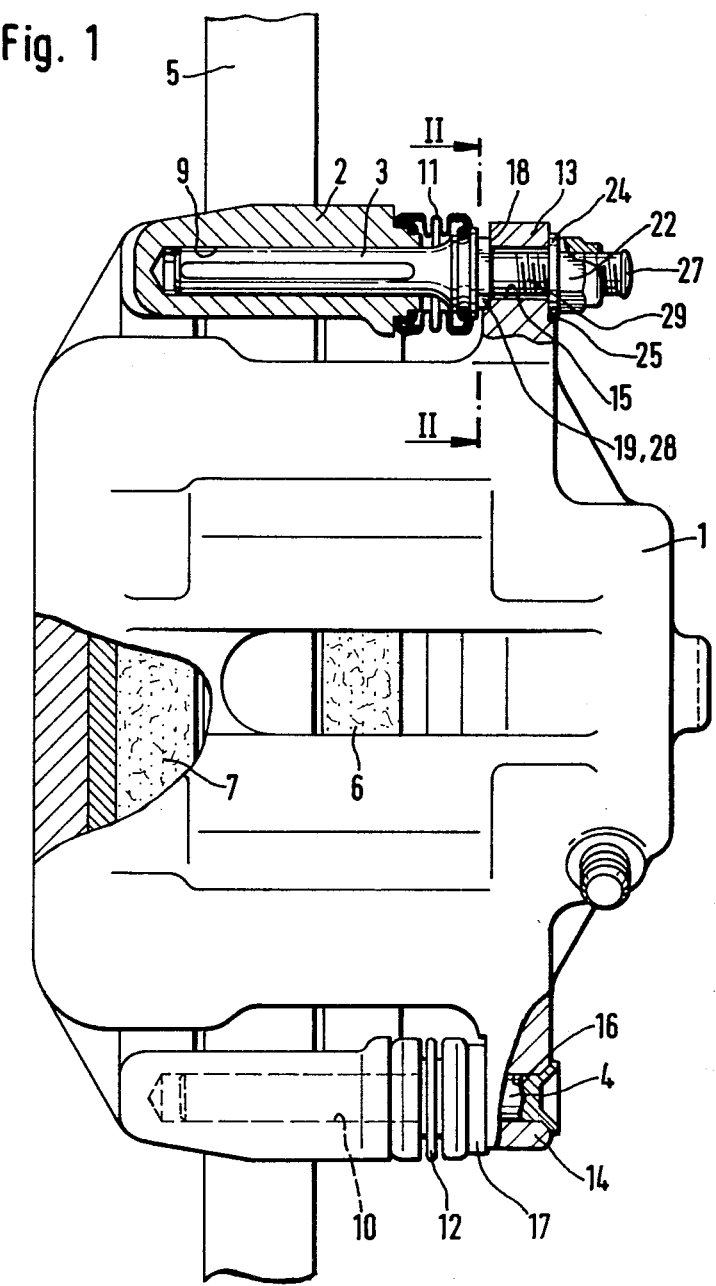
FIG. 1 is a partially sectioned top plan view of a bolt-guided fist-type caliper disc brake equipped with a mounting arrangement of the present invention.

Referring now to the drawing in detail, and first to FIG. 1 thereof, it may be seen that it illustrates a fist-type caliper disc brake. This disc brake comprises a caliper component 1 which is slidably guided by means of two guide bolts 3, 4 with respect to a brake carrier component 2. The carrier component 2 is rigidly connected to the vehicle. The caliper component 1 is generally U-shaped and embraces a brake disc 5. Only one of the legs of the caliper component 1 carries a hydraulic actuating device including a piston which directly actuates its associated brake shoe 6. The brake shoe 7 disposed on the other side of the disc 5 is in abutment with the other leg of the caliper component 1. When the brake is applied, the directly actuated brake shoe 6 will be moved into contact with the disc 5 on displacement of the piston, while the caliper component 1 will be displaced relative to the brake carrier component 2 by the reaction force acting on the cylinder of the hydraulic actuating device until the other brake shoe 7 contacts the disc 5. The support of both brake shoes 6, 7 in the circumferential direction of the disc 5 against the brake forces produced during the braking operation is accomplished by having both brake shoes 6, 7 abut associated supporting surfaces on the brake carrier component 2.

The two guiding bolts 3, 4 are respectively axially slidably guided in two guide bores 9, 10 in the brake carrier component 2. The guiding bolts 3, 4 are rigidly connected to the caliper component 1. The area of the guiding bolts 3, 4 disposed between the brake carrier component 2 and the caliper component 1 is protected against contamination by seals, in this embodiment by undulating bellows 11, 12. The two undulating bellows 11, 12 are secured to the respective guiding bolts 3, 4 by having one end thereof recieved in a groove of the latter, while they are attached to the brake carrier component 2 at their respective other end.

One guiding bolt 3 is detachably fastened, while the other guiding bolt 4 is undetachably connected to the caliper component 1. The caliper component 1 includes two caliper mounting portions 13, 14 which are spaced from one another in circumferential direction and have continuous recesses 15, 16. The guiding bolt 4 which is undetachably connected is inserted with its free end into the recess 16 up to a step 17 and is secured by being riveted, for instance, to the caliper mounting portion 14. For this purpose, the end of the guiding bolt 4 is suitably constructed, such as by having a depression. The detachable guide bolt 3 is secured to the caliper component 1 by a threaded connection. For this reason, the guiding bolt 3 has at its end area a threaded portion 29 having a nut 22 threaded thereon. Furthermore, the guiding bolt 3 has a step 18 serving as a stop when tightening the threaded coupling or connection. The guiding bolt 3 is provided with a square portion 19 which acts as a torsion or turning preventing mechanism. By virtue of the fact that one of the square portion surfaces 20 abuts an abutment surface 8 of a correspondingly situated caliper edge 21, the guiding bolt 3 is prevented from turning about its axis. The nut 22 is self-locking in this embodiment; however, any other customary locking mechanism for nuts can be employed instead. The recess 15 in the caliper mounting portion 13 for this detachable guiding bolt 3 is connected by a slot 23 extending over its entire axial length to a peripheral surface 26 of the caliper mounting portion 13. Thus, this slot 23 provides a free path from the periphery of the caliper component 1 to the bottom of the recess 15 for the movement of the guiding bolt 3 in a predetermined direction into and out of the recess 15.

This construction renders it possible to pivot the caliper component 1 during brake shoe replacement operation about the guiding bolt 4 which is fastened undetachably to the caliper component 1, resulting in free access to the brake shoes 6, 7 which are supported on the brake carrier component 2. To achieve this, it is only necessary to loosen the nut 22, whereupon it is possible to rotate the caliper component 1 about the other guiding bolt 4, because of the provision of the slot 23 between the recess 15 and the periphery of the caliper component 1, while the guide bolt 3 remains in position.

To achieve that the caliper component 1 is held in its operating position not only by the frictional engagement of the threaded coupling, particularly of the nut 22, with the caliper component 1, a cylindrical collar 24 is provided on the nut 22 extending with little clearance into a corresponding shaped axial indentation 25 in the caliper mounting portion 13. After the tightening of the nut 22, the caliper component 1 will be secured both by frictional and positive engagement against swinging away from its position. Furthermore, the position of the caliper component 1 is accurately reproducible after each swing-in movement in that only a small clearance exists between the outer diameter of the collar 24 and the inner diameter of the indentation 25, even if there is provided a large clearance between the guiding bolt 3 and the surfaces bounding the slot 23.

Figure 2:
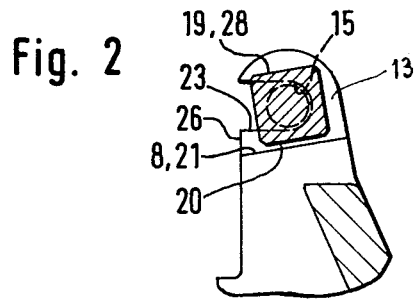
FIG. 2 is a cross-sectional view taken along the line II—II of FIG. 1.

FIG. 2 shows details of the square portion 19 and of an edge 21 of the abutment surface 8 provided on the caliper component 1 as a part of the torsion-preventing mechanism for the guiding bolt 3. Simultaneously, the square portion 19 of the guiding bolt 3 serves as a stop 18 against which the caliper mounting portion 13 will bear when the nut 22 is tightened. The abutment surface 8 delimited by the edge 21 is so formed that the outward portion of the caliper mounting portion 13, as considered in the circumferential direction, is provided with an indentation, the axial dimension of the indentation being somewhat smaller than the axial length of the square portion 19. The edge 21 deviates at an acute angle from the course of the slot 23 and has the maximum distance from the slot 23 at the peripheral surface 26 of the caliper mounting portion 13, at which the slot 23 terminates. The distance from the edge 21 to the center of the slot 23 at the peripheral surface 26 is greater than half the length of the diagonal of the square portion 19. It will thus be attained that the bolt 3, if it has been turned about its axis, for example during brake shoe replacement, adjusts itself automatically in such a manner that, with the caliper component 1 swung into its operating position, one abutment surface 20 of the square portion 9 rests on the caliper edge 21 in positive engagement therewith. Thus, for instance, if the square portion 19 is disposed diagonally with respect to the course of the slot 23, as the portion 19 enters the slot 23, the bolt 3 will be turned during its movement into the slot 23 into a position in which one abutment surface, such as 20, of the square portion 19 extends in parallel to the abutment surface 8 delimited by the caliper edge 21 as a result of its contact with the caliper edge 21 during the hang-in movement. After the nut 22 has been threaded on the bolt 3, a projecting bead 27 is formed on the threaded end portion of the guiding bolt 3. This bead 27 prevents the nut 22 from becoming inadvertently unthreaded during the brake shoe replacement.

Figure 3:
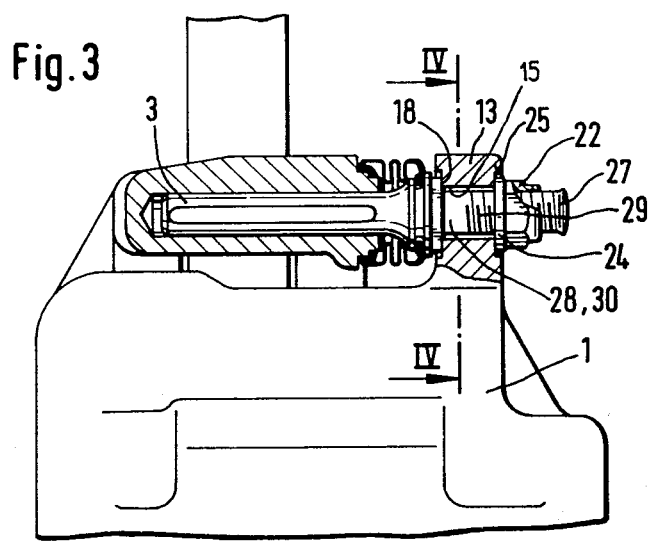
FIG. 3 is a view similar to that of FIG. 1 but showing only a part of the disc brake and a modified construction of the mounting arrangement.
Figure 4:
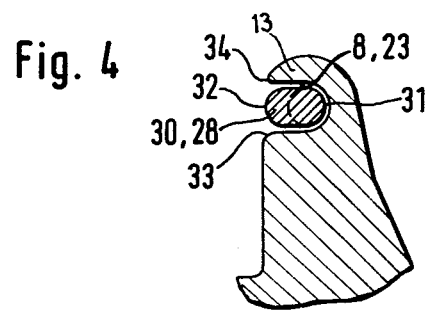
FIG. 4 is a parital cross-sectional view taken along the line IV—IV of FIG. 3.

FIGS. 3 and 4 show details of a differently designed torsion-preventing mechanism which renders it possible to quickly dismount and re-mount the caliper component 1.

First the step 18 is arranged at the end area of the guiding bolt 3 close to the caliper component 1, to serve as a stop for the caliper component 1 during the tightening of the threaded nut 22. Adjacent thereto, there is provided a key-bit-shaped cam or abutment surface 28 whose length is smaller than the axial thickness of the caliper mounting portion 13. Extending from the cam 28 to the free end of the bolt 3 is a threaded portion 29 whereon the nut 22 is threaded. As in the preceding embodiment, the end of the bolt 3 includes a bead 27 for locking the nut 22. A key-bit-shaped portion 30 which has the cam surface 28 has curvatures 31, 32. The axis of the curvature 31 coincides with the longitudinal axis of the bolt 3, so that the cam surface 28 is formed only on one side of the guiding bolt 3. As a result of this arrangement, when in an undesirable turned position, the guiding bolt 3 will be adjusted in such a manner that one of the edges 33, 34 disposed at the slot 23 will move in contact with a peripheral surface of the portion 30 and turn the latter to assume the position in which the peripheral surface abuts at the slot wall. In this design as well, there is provided a positive locking mechanism by means of the indentation 25 and the collar 24 of the nut 22.

In the same manner as described hereinabove, the present invention may also be employed in floating-caliper brakes in which the guiding bolts 3 and 4 are to be rigidly mounted on the brake carrier component and are to be slidable in guide bores of the caliper component. Furthermore, the principles of the present invention may be analogously used even in brakes having more than two guiding bolts.

While we have described above the principles of our invention in connection with specific apparatus, it is to be clearly understood that this description is made only by way of example and not as a limitation to the scope of our invention as set forth in the accompanying claims.

We claim:

1. A mounting arrangement for use in a spot-type disc brake including a carrier component and a caliper component for mounting on one of the components an elongated guiding bolt which is received for sliding in its axial direction in a bore of the other component and has a threaded portion disposed at the exterior of the bore, comprising means on the one component for delimiting a recess for partially receiving the guiding bolt such that at least an end section of the threaded portion extends beyond said recess as considered axially away from the other component, said recess being open over the entire axial length thereof onto the periphery of the one component to leave a free path for the movement of the threaded bolt in a predetermined transverse direction into and out of said recess;

cooperating abutment means on the threaded bolt and on the one component for preventing the threaded bolt from turning about its longitudinal axis when received in said recess; and a nut threaded onto said end section of the threaded portion of threaded bolt and engaging the one component in its tightened condition so as to prevent movement of the threaded bolt in said predetermined transverse direction relative to the other component.

2. The mounting arrangement as defined in claim 1, wherein said delimiting means includes a first abutment surface at least partially bounding said recess and constituting that part of said abutment means which is provided on the one component; and wherein the threaded bolt has a portion which is aligned with said abutment surface when the threaded bolt is received in said recess and has a second abutment surface which is eccentric radial to the longitudinal axis of the recess and contacts said first abutment surface when the threaded bolt is received in said recess to constitute the other part of said abutment means.

3. The mounting arrangement as defined in claim 1, wherein that part of said abutment means which is provided on the threaded bolt is constituted by an abutment section of the threaded bolt which has a first abutment surface eccentric radial to the longitudinal axis of the recess; and wherein the other part of the abutment means includes a second abutment surface stationary relative to the one component and extending into the trajectory of turning movement of said first abutment surface when the threaded bolt is received in said recess.

4. The mounting arrangement as defined in claim 3, wherein said abutment section has a configuration similar to that of a key bit.

5. The mounting arrangement as defined in claim 3, wherein said second abutment surface is situated outside of said recess at that side of the one component which is closer to the other component.

6. The mounting arrangement as defined in claim 3, wherein said abutment section is substantially rectangular in cross section.

7. The mounting arrangement as defined in claim 3, wherein said means for delimiting said recess extends substantially parallel to said predetermined transverse direction; and wherein said second abutment surface is inclined at an acute angle to said means for delimiting said recess and diverges therefrom in direction toward the periphery of the one component.

* * * * *